(12) United States Patent
Xu et al.

(10) Patent No.: US 11,224,849 B2
(45) Date of Patent: *Jan. 18, 2022

(54) SCALE COLLECTION DEVICE FOR DOWNFLOW REACTORS

(71) Applicant: UOP LLC, Des Plaines, IL (US)

(72) Inventors: Zhanping Xu, Inverness, IL (US); Pengfei Chen, Glenview, IL (US)

(73) Assignee: UOP LLC, Des Plaines, IL (US)

( * ) Notice: Subject to any disclaimer, the term of this patent is extended or adjusted under 35 U.S.C. 154(b) by 483 days.

This patent is subject to a terminal disclaimer.

(21) Appl. No.: 16/220,981

(22) Filed: Dec. 14, 2018

(65) Prior Publication Data

US 2019/0232198 A1    Aug. 1, 2019

Related U.S. Application Data

(60) Provisional application No. 62/609,284, filed on Dec. 21, 2017.

(51) Int. Cl.
*B01J 8/00* (2006.01)
*B01D 17/02* (2006.01)
(Continued)

(52) U.S. Cl.
CPC ............ *B01J 8/0085* (2013.01); *B01D 17/02* (2013.01); *B01D 21/0042* (2013.01);
(Continued)

(58) Field of Classification Search
CPC  B01D 17/02; B01D 19/0068; B01D 21/0042; B01D 21/0045; B01D 24/183; B01J 8/0085; B01J 8/025; B01J 8/0257; B01J 8/0278; B01J 8/0492; B01J 2208/00796; B01J 2208/0092; B01J 2208/00929; B01J 2208/00938
See application file for complete search history.

(56) References Cited

U.S. PATENT DOCUMENTS 3,607,000 A  *  9/1971  Beal ..................... B01J 8/0492
                                                    423/659
4,380,529 A       4/1983  Gupta
(Continued)

FOREIGN PATENT DOCUMENTS

CN         1765478 A     5/2006
CN       101279226 A    10/2008
(Continued)

OTHER PUBLICATIONS

International Search Report and Written Opinion from corresponding PCT Application No. PCT/US2018/066666, dated Apr. 4, 2019.
(Continued)

*Primary Examiner* — Lessanework Seifu

(57) ABSTRACT

The invention involves a scale collection device that is located within downflow reactor head for removing solids from feed streams to increase reactor operating cycle time without impact on effective reactor space for catalyst loading and reactor pressure drop. More particularly, a scale collection device is in an upper portion of a reactor vessel above a rough liquid distribution tray and a vapor-liquid distribution tray.

22 Claims, 1 Drawing Sheet

(51) Int. Cl.
*B01D 21/00* (2006.01)
*B01J 8/02* (2006.01)
*B01J 8/04* (2006.01)
*B01D 19/00* (2006.01)

(52) U.S. Cl.
CPC ......... *B01D 21/0045* (2013.01); *B01J 8/025* (2013.01); *B01J 8/0257* (2013.01); *B01J 8/0278* (2013.01); *B01J 8/0492* (2013.01); *B01D 19/0068* (2013.01); *B01J 2208/0092* (2013.01); *B01J 2208/00796* (2013.01); *B01J 2208/00929* (2013.01); *B01J 2208/00938* (2013.01)

(56) References Cited

U.S. PATENT DOCUMENTS

| | | | |
|---|---|---|---|
| 4,836,989 A | 6/1989 | Aly et al. | |
| 5,158,714 A * | 10/1992 | Shih | B01J 8/0492 261/96 |
| 5,484,578 A * | 1/1996 | Muldowney | B01J 8/0278 422/220 |
| 8,181,942 B2 | 5/2012 | Sechrist | |
| 8,487,151 B2 | 7/2013 | Koudil et al. | |
| 8,673,246 B2 | 3/2014 | Chen et al. | |
| 9,364,810 B2 | 6/2016 | Merkel et al. | |
| 9,480,957 B2 | 11/2016 | Bazer-Bachi et al. | |
| 2004/0097756 A1* | 5/2004 | Thiel | B01J 8/0492 562/600 |
| 2011/0092754 A1* | 4/2011 | Koudil | B01J 8/0492 585/264 |
| 2011/0201856 A1 | 8/2011 | Cottard et al. | |
| 2012/0269699 A1 | 10/2012 | Kumar et al. | |
| 2013/0296610 A1* | 11/2013 | Merkel | B01J 8/0292 564/420 |
| 2014/0097125 A1 | 4/2014 | Bazer-Bachi et al. | |
| 2015/0004074 A1 | 1/2015 | Lesniak et al. | |
| 2017/0015917 A1 | 1/2017 | Muller | |

FOREIGN PATENT DOCUMENTS

| | | |
|---|---|---|
| CN | 103131472 A | 6/2013 |
| CN | 204234070 U | 4/2015 |
| EP | 0050505 A2 | 4/1982 |
| EP | 2918332 A1 | 9/2015 |
| WO | 2006076923 A1 | 7/2006 |
| WO | 2007023225 A1 | 3/2007 |
| WO | 2015036066 A1 | 3/2015 |
| WO | 2015136066 A1 | 9/2015 |
| WO | 2017080756 A1 | 5/2017 |

OTHER PUBLICATIONS

International Search Report and Written Opinion from corresponding PCT Application No. PCT/US2018/066659, dated Mar. 28, 2019.
International Search Report and Written Opinion from corresponding PCT Application No. PCT/US2018/066684, dated Mar. 21, 2019.
International Search Report and Written Opinion from corresponding PCT Application No. PCT/US2018/066663, dated Mar. 28, 2019.
International Search Report and Written Opinion from corresponding PCT Application No. PCT/US2018/066678, dated Apr. 4, 2019.
International Search Report and Written Opinion from corresponding PCT Application No. PCT/US2018/066682, dated Apr. 4, 2019.
International Preliminary Report on Patentability from corresponding PCT Application No. PCT/US2018/066666, dated Jun. 23, 2020.
International Preliminary Report on Patentability from corresponding PCT Application No. PCT/US2018/066659, dated Jun. 23, 2020.
International Preliminary Report on Patentabilityfrom corresponding PCT Application No. PCT/US2018/066674, dated Jun. 23, 2020.
International Preliminary Report on Patentability from corresponding PCT Application No. PCT/US2018/066663, dated Jun. 23, 2020.
International Preliminary Report on Patentability from corresponding PCT Application No. PCT/US2018/066678, dated Jun. 23, 2020.
International Preliminary Report on Patentability from corresponding PCT Application No. PCT/US2018/066682, dated Jun. 23, 2020.
Extended European Search report from European application No. 18892042.5 dated Aug. 9, 2021.
Extended European Search report from European application No. 18891437.8 dated Jul. 30, 2021.
Li, Dadong, Hydrotreating Processes and Engineering, China Petrochemical Press, Dec. 2004.

* cited by examiner

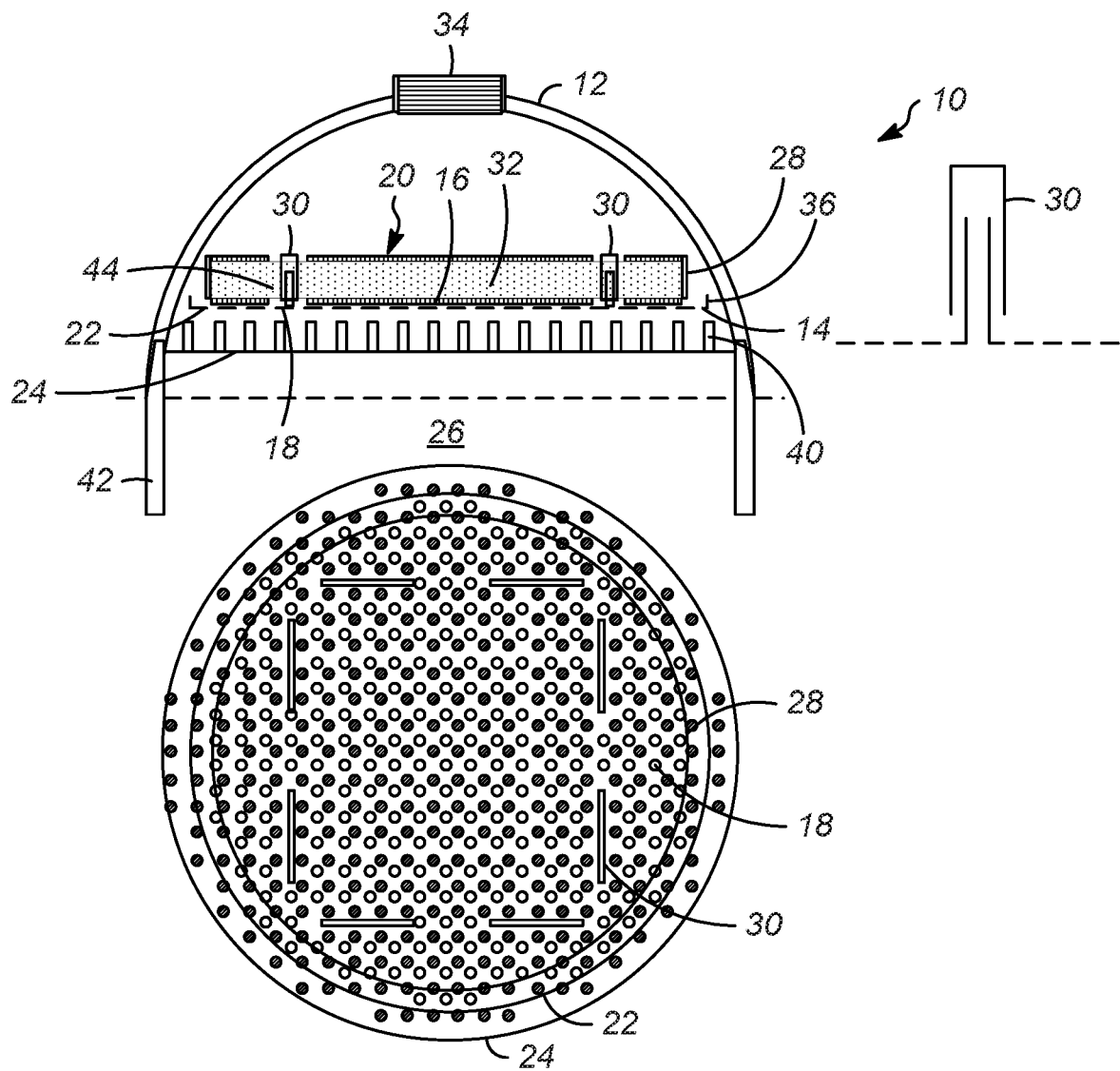

SCALE COLLECTION DEVICE FOR DOWNFLOW REACTORS

CROSS-REFERENCE TO RELATED APPLICATION

This application claims priority from U.S. Provisional Application No. 62/609,284 filed Dec. 21, 2017, the contents of which cited application are hereby incorporated by reference in its entirety.

FIELD OF THE INVENTION

The invention relates to a device for improved operation of downflow reactors. More particularly, the invention involves a scale collection device that is located within downflow reactor head for removing solids from feed streams to increase reactor operating cycle time without impact on effective reactor space for catalyst loading and reactor pressure drop.

BACKGROUND OF THE INVENTION

In downflow reactors, such as downflow reactors, a layer of filtering material is often placed on top of the first catalyst bed to catch particles such as fines and scales. Typically, this layer may be 6 to 36 inches thick and reduces the space available for the catalyst to take up. In addition, the filtering material has to be removed and replaced within an operating cycle when solids accumulates within the layer of filtering material or between the filtering material and catalyst bed causing a high pressure drop. In commercial operation, the feed rates may vary widely (e.g. 60 to 110% of design). The challenge is to design a scale collection device that can effectively remove solids from reactor feed streams without reducing catalyst loading and can be easily cleaned and maintained during turnaround.

SUMMARY OF THE INVENTION

The invention involves a reactor comprising an upper portion and a lower portion wherein the upper portion contains a scale collection device. The scale collection device is composed of a filtering zone located above a rough liquid distribution tray and wherein a vapor-liquid distribution tray is located below said rough liquid distribution tray and wherein the lower portion contains a catalyst bed. The filtering zone may comprise a single layer or multiple layers of filtering materials having the same or different physical and chemical properties. The filtering zone contains porous ceramic pellets or other materials that achieve a similar function. The filtering materials are enclosed by a cylindrical side wall attached to the bottom plate of the rough liquid distribution tray. The diameter of the cylindrical wall is smaller than that of rough liquid distribution tray. The filtering zone is spaced above the bottom perforated plate of the rough liquid distribution tray by a plurality of spacers or of grating materials so that the holes on the bottom plate of the rough liquid distribution tray is not plugged by the filtering materials. The spacers or gratings sit directly on the perforated plate of the rough liquid distribution tray within the cylindrical side wall. A layer of wire mesh may be placed above spacers or gratings and at bottom of the filtering bed so that the filtering materials will not fall onto the perforated plate of the rough liquid distribution tray. A plurality of chimneys with caps attached to the bottom of the perforated plate of the rough liquid distribution tray for liquid overflow such that the tray can be operated in a wide range of liquid flows while maintaining full of liquid in the filtering zone during operation for maximizing solid removal efficiency. The addition of the caps to the chimneys is for making sure that the overflow liquid must enter the chimneys from a clearance at bottom of the caps close to the tray floor such that it will not bypass the filtering materials for solid removal material.

BRIEF DESCRIPTION OF THE DRAWING

The FIGURE shows the upper portion of a reactor showing a scale collection device located above the distribution trays.

DETAILED DESCRIPTION OF THE INVENTION

It has now been found that a different arrangement is preferred to filter particles from a feed stream in a downflow reactor. More particularly, a scale collection device is located within an upper portion of a downflow reactor or reactor head for removing solids from feed streams and to increase reactor operating cycle time without any impact on the amount of effective reactor space for catalyst loading. It has also been found that the solid removal efficiency and the effective use of the filtering material for solid removal can be greatly improved by maintaining a certain liquid level within the device to improve uniformity of liquid flow distribution and to reduce liquid flow velocity through the filtering zone. This is achieved by a specially designed scale collection device located within a reactor head. As shown in the FIGURE, the scale collection device 20 is constructed with a cylindrical side wall 28 and one or multiple layers of filtering materials 44 sitting above a rough liquid distribution tray 22. A layer of grating and wire mesh 16 may be placed between the perforated plate 14 of the rough liquid distribution tray 22 and the filtering zone 32 so that the filtering materials 44 will not fall onto the perforated plate 14 causing the perforations being plugged. Multiple chimneys with caps 30 are attached to the perforated plate 14 within the cylindrical wall 28 for liquid overflow at high feed rates. The filtering zone contains one or more layers of filtering materials 44 with the same or different physical and chemical properties. There may be a hold-down grid at top of the filtering material 44 to keep the filtering material 44 from moving around. The top of cylindrical side wall 28 is notched for controlling liquid overflow around the top of the cylindrical side when the filtering zone 32 is plugged. The chimneys with caps 30 are extended above top of the filtering zone 32 and overflow liquid needs to pass the filtering zone 32 before entering into chimneys. The height of the chimneys are designed to maintain a certain liquid level in the scale collection device 20 before liquid overflows through the chimneys. The liquid from the perforated plate 14 and the overflow liquid from the chimneys falls onto a vapor-liquid distribution tray 24 below for redistribution. The chimneys are sized and positioned such that the overflow liquid will not fall onto top of the plurality of distributors on the vapor-liquid distribution tray 24 the distributors do not have caps above top of the openings for vapor entry.

Gas and liquid enter into the reactor through an inlet distributor 34. The inlet flow stream may be straightened vertically downwards by an orifice plate at top of the distributor. The liquid is distributed across the top of the scale collection device 20. Gas is separated from liquid in the space between the inlet distributor 34 and top of the scale collection device 20. The liquid flows downward through the scale collection device 20 while the gas through an open annular area between the cylindrical side wall 28 and reactor head 12. With gas bypassing the filtering material 44, the pressure drop will not increase even with the filtering material 44 filled with solids.

With this design, the reactor cycle time can be increased by the additional filter bed within top reactor head 12 or catalyst loading increased by reducing the filtering material 44 on top of the catalyst bed 26.

The liquid out of the filtering zone 32 is redistributed by the rough liquid distribution tray 22 below. Gas and liquid are then distributed through a vapor-liquid distribution tray 24 in fluid communication with the rough liquid distribution tray 22 to the catalyst bed 26. The rough distribution tray 22 includes an upper liquid retention baffle 36.

As shown in the FIGURE, according to one or more embodiments of the present invention, in order to remove the scales and fines in a liquid stream from within reactor 10 is shown an outer reactor shell having a rounded upper portion. The lower portion of reactor 10 contains a catalyst bed 26. A scale collection device 20 is located above a rough liquid distribution tray 22 and a vapor-liquid distribution tray 24. In the scale collection device 20, a filtering zone 32 is located a small distance above the bottom perforated plate 14 that has a series of perforations 18. Sections of the grating are placed within the cylindrical side wall 28 on the bottom perforated plate 14 for supporting the filtering material 44 in filtering zone 32. The grating is mostly open (over 50%) for not restricting liquid flow through the scale collection device 20 to the rough liquid distribution tray 22. The total open area of the perforations 18 on bottom perforated plate 14 is designed such that a certain liquid level is maintained within the scale collection device 20 at the minimum operating liquid load. The top of cylindrical side wall 28 of the scale collection device 20 has notches or openings, such as triangular or rectangular openings for liquid overflow in case that the filtering zone 32 is plugged by solids. To prevent the overflow liquid from bypassing the filtering zone 32 without filtration, one or more chimneys with caps 30 are attached to the rough liquid distribution tray 22. The chimneys are extended up above the rough liquid distribution tray 22 for maintaining a certain liquid level on tray before liquid overflow through the chimneys. The caps on top of the chimneys are spaced a small distance above the perforated plate of the rough liquid distribution tray 22 for liquid entry so that the overflow liquid will not bypass the filtering materials 44. The chimneys and caps can be designed in various shapes and sizes and it is preferred that the overflow liquid will not fall on the top of the distributors 40. In the example illustrated in the FIGURE, there are a total of 8 rectangular chimneys and caps 30. Circular or square shape of chimneys and caps may also be used. The liquid from the scale collection device 20 then passes down to the rough liquid distribution tray 22 for redistribution to a vapor-liquid distribution tray 24. The gas and liquid from the vapor-liquid distribution tray 24 are then pass the catalyst bed 26 below. The vapor-liquid distribution tray 24 has numerous distributors 40 for uniformly distributing gas and liquid across the top of the catalyst bed 26.

The scale collection device 20, the rough liquid distribution tray 22 and the vapor-liquid distribution tray 24 can be supported by a set of double-truss beams on one support ring attached to the reactor shell 42.

The filtering material 44 used in the filtering zone 32 may comprise pellets, sheets or other configuration of a porous material as known in the art. Preferred materials for the filtering zone are ceramic pellets which have a high internal porosity, such as the products available from Crystaphase Technologies, Inc., located in Houston, Tex. USA. One or more layers of the filtering materials 44 with the same or different physical and chemical properties may be used in the filtering zone 32. Other filtering materials 44 may be used. The grating or grating with a wire mesh sheet 16 above, upon which the filtering material 44 is supported has openings that are smaller than the size of the filtering material 44.

With respect to the collection of the solid materials from the liquid, the configuration also reduces the tendency of rough liquid distribution tray 22, and vapor-liquid distribution tray 24 being plugged by solids. The quality of liquid distribution through the rough liquid distribution tray 22 and vapor-liquid distribution tray 24 was also found improved due to the reduced disturbance of liquid on the rough liquid distribution tray 22 by the scale collection device 20 above.

The filtering materials 44 can be loaded into the scale collection device 20 with various methods such as socket or bucket and removed by vacuum. The device is easy to clean and maintain after the filtering materials 44 removed during turn-around.

As the entire scale collection device 20 is filled with filtering materials 44 and the total void fraction of the filtering materials 44 can be as high as 93%, the device has a high solid removal capacity. The solid removal efficiency is also high due to the special design of the scale collection device 20 with the filtering material 44 mostly submerged in the liquid pool and no liquid bypassing the device without filtration before the device reaches the full capacity of solid removal.

Specific Embodiments

While the following is described in conjunction with specific embodiments, it will be understood that this description is intended to illustrate and not limit the scope of the preceding description and the appended claims.

While the following is described in conjunction with specific embodiments, it will be understood that this description is intended to illustrate and not limit the scope of the preceding description and the appended claims.

A first embodiment of the invention is an apparatus comprising an upper portion and a lower portion wherein the upper portion contains a scale collection device above a rough liquid distribution tray, wherein a vapor-liquid distribution tray is located below the rough liquid distribution tray and wherein the scale collection device comprises a cylindrical wall attached to the bottom plate of the rough liquid distribution tray and a layer of spacing material sitting on the rough liquid distribution tray bottom plate having a plurality of perforations and a series of chimneys with caps affixed to the rough liquid distribution tray. An embodiment of the invention is one, any or all of prior embodiments in this paragraph up through the first embodiment in this paragraph, wherein the scale collection device has a filtering zone spaced a short distance above bottom plate and the filtering zone comprises a single layer if filtering material having the same physical and chemical properties. An embodiment of the invention is one, any or all of prior embodiments in this paragraph up through the first embodiment in this paragraph, where the diameter of cylindrical wall is smaller than that of the rough liquid distribution tray; An embodiment of the invention is one, any or all of prior embodiments in this paragraph up through the first embodiment in this paragraph, wherein the scale collection device has a filtering zone with two or more layers of filtering materials with different physical or chemical properties. An embodiment of the invention is one, any or all of prior embodiments in this paragraph up through the first embodiment in this paragraph, wherein the filtering zone comprises porous ceramic pellets. An embodiment of the invention is one, any or all of prior embodiments in this paragraph up through the first embodiment in this paragraph, wherein the filtering zone comprises filtering materials containing active materials for promoting certain chemical reactions. An embodiment of the invention is one, any or all of prior embodiments in this paragraph up through the first embodiment in this paragraph, wherein the scale collection device is spaced above the rough liquid distribution tray by a plurality of spacers or gratings. An embodiment of the invention is one, any or all of prior embodiments in this paragraph up through the first embodiment in this paragraph, wherein the scale collection device comprises profile wire. An embodiment of the invention is one, any or all of prior embodiments in this paragraph up through the first embodiment in this paragraph, wherein the scale collection device comprises grating. An embodiment of the invention is one, any or all of prior embodiments in this paragraph up through the first embodiment in this paragraph, wherein the scale collection device comprises wire mesh. An embodiment of the invention is one, any or all of prior embodiments in this paragraph up through the first embodiment in this paragraph, wherein the scale collection device comprises chimneys covered by caps. An embodiment of the invention is one, any or all of prior embodiments in this paragraph up through the first embodiment in this paragraph, wherein the chimneys and caps are in long rectangular shape positioned across the rough liquid distribution tray. An embodiment of the invention is one, any or all of prior embodiments in this paragraph up through the first embodiment in this paragraph, wherein the chimneys and caps are in circular or square shape distributed across the rough liquid distribution tray. An embodiment of the invention is one, any or all of prior embodiments in this paragraph up through the first embodiment in this paragraph, wherein the chimneys are sized such that the liquid overflowing through the chimneys are not falling onto top of the distributors on vapor-liquid distribution tray. An embodiment of the invention is one, any or all of prior embodiments in this paragraph up through the first embodiment in this paragraph, wherein the side wall of the scale collection device contains notches. An embodiment of the invention is one, any or all of prior embodiments in this paragraph up through the first embodiment in this paragraph, wherein the caps comprise upper portions that extend down below the filtering bed. An embodiment of the invention is one, any or all of prior embodiments in this paragraph up through the first embodiment in this paragraph, wherein the rough liquid distribution tray contains holes are numbered and sized to generate the desired liquid level within the scale collection device. An embodiment of the invention is one, any or all of prior embodiments in this paragraph up through the first embodiment in this paragraph, wherein the rough liquid distribution tray is larger than the scale collection device so that the overflow liquid from the side wall can be captured by the rough liquid distribution tray for redistribution.

A second embodiment of the invention is an apparatus comprising an upper portion and a lower portion wherein the upper portion contains a scale collection device located above a rough liquid distribution tray, wherein a vapor-liquid distribution tray is located below the rough liquid distribution tray and wherein the rough liquid distribution tray comprises a plurality of chimneys and caps. An embodiment of the invention is one, any or all of prior embodiments in this paragraph up through the second embodiment in this paragraph, wherein the scale collection device comprises a filtering zone, wherein the filtering zone comprises one or more layers of filtering materials having the same or different physical or chemical properties. An embodiment of the invention is one, any or all of prior embodiments in this paragraph up through the second embodiment in this paragraph, wherein the filtering zone comprises porous ceramic pellets. An embodiment of the invention is one, any or all of prior embodiments in this paragraph up through the second embodiment in this paragraph, wherein the rough liquid distribution tray contains holes sized and numbered to generate the desired liquid level within the filtering zone.

Without further elaboration, it is believed that using the preceding description that one skilled in the art can utilize the present invention to its fullest extent and easily ascertain the essential characteristics of this invention, without departing from the spirit and scope thereof, to make various changes and modifications of the invention and to adapt it to various usages and conditions. The preceding preferred specific embodiments are, therefore, to be construed as merely illustrative, and not limiting the remainder of the disclosure in any way whatsoever, and that it is intended to cover various modifications and equivalent arrangements included within the scope of the appended claims. In the foregoing, all temperatures are set forth in degrees Celsius and, all parts and percentages are by weight, unless otherwise indicated.

The invention claimed is:

1. A reactor comprising an upper portion and a lower portion, the upper portion comprising:
   a rough liquid distribution tray comprising a bottom plate comprising a plurality of perforations and a separate plurality of chimneys with caps affixed to the bottom plate and extending upward therefrom;
   a vapor-liquid distribution tray located below the rough liquid distribution tray, and
   a scale collection device above the bottom plate, the scale collections device comprising a cylindrical wall attached to the bottom plate, and a filtering zone comprising filtering material.

2. The reactor of claim 1, wherein the filtering zone comprises a single layer of the filtering material having the same physical and chemical properties.

3. The reactor of claim 1, where the diameter of cylindrical wall is smaller than that of the rough liquid distribution tray.

4. The reactor of claim 1, wherein the filtering zone comprises two or more layers of the filtering materials with different physical or chemical properties.

5. The reactor of claim 1, wherein the filtering zone comprises porous ceramic pellets.

6. The reactor of claim 1, wherein the filtering zone comprises filtering materials containing active materials for promoting certain chemical reactions.

7. The reactor of claim 1, wherein the scale collection device is spaced above the rough liquid distribution tray by a plurality of spacers or gratings.

8. The reactor of claim 1, wherein the scale collection device comprises profile wire.

9. The reactor of claim 1, wherein the scale collection device comprises grating.

10. The reactor of claim 1, wherein the scale collection device comprises wire mesh.

11. The reactor of claim 1, wherein the chimneys and caps have a long rectangular shape positioned across the rough liquid distribution tray.

12. The reactor of claim 1, wherein the chimneys and caps have a circular or square shape distributed across the rough liquid distribution tray.

13. The reactor of claim 11, wherein the chimneys are sized and positioned such that the liquid overflowing through the chimneys does not fall onto a top of distributors on the vapor-liquid distribution tray.

14. The reactor of claim 1, wherein the side wall of the scale collection device contains notches.

15. The reactor of claim 1, wherein the caps comprise upper portions that extend down below the filtering material.

16. The reactor of claim 1, wherein the rough liquid distribution tray contains holes numbered and sized to generate a desired liquid level within the scale collection device.

17. The reactor of claim 1, wherein the rough liquid distribution tray is larger than the scale collection device so that the overflow liquid from the side wall can be captured by the rough liquid distribution tray for redistribution.

18. The reactor of claim 1, further comprising a layer of spacing material sitting on the rough liquid distribution tray.

19. An apparatus comprising an upper portion and a lower portion the upper portion comprising:
   a rough liquid distribution tray comprising plurality of perforations and a separate plurality of chimneys and caps extending upward from the rough liquid distribution tray;
   a vapor-liquid distribution tray located below the rough liquid distribution tray, and
   a scale collection device above the rough liquid distribution tray, the scale collection device comprising a cylindrical wall defining a filtering zone comprising filtering material.

20. The apparatus of claim 19, wherein the filtering zone comprises one or more layers of filtering materials having the same or different physical or chemical properties.

21. The apparatus of claim 20, wherein the filtering zone comprises porous ceramic pellets.

22. The apparatus of claim 19, wherein the rough liquid distribution tray contains holes sized and numbered to generate a desired liquid level within the filtering zone.

* * * * *